United States Patent Office 3,402,794
Patented Sept. 24, 1968

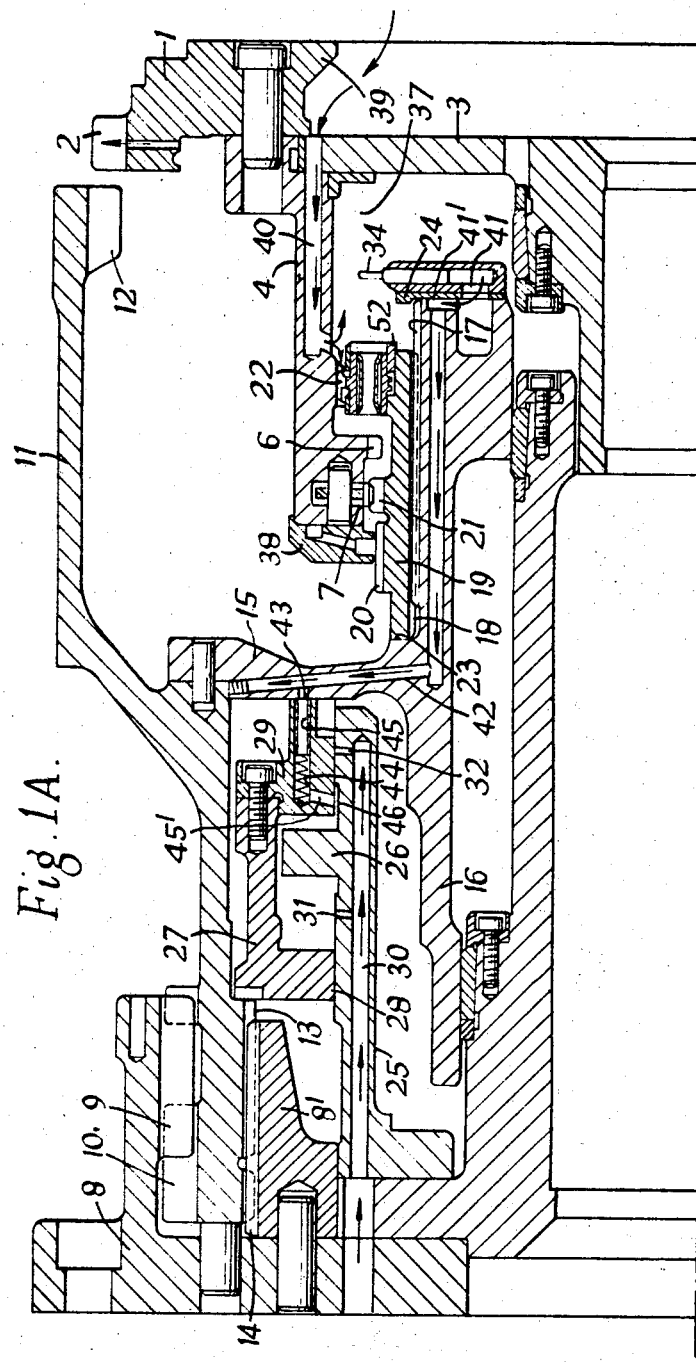

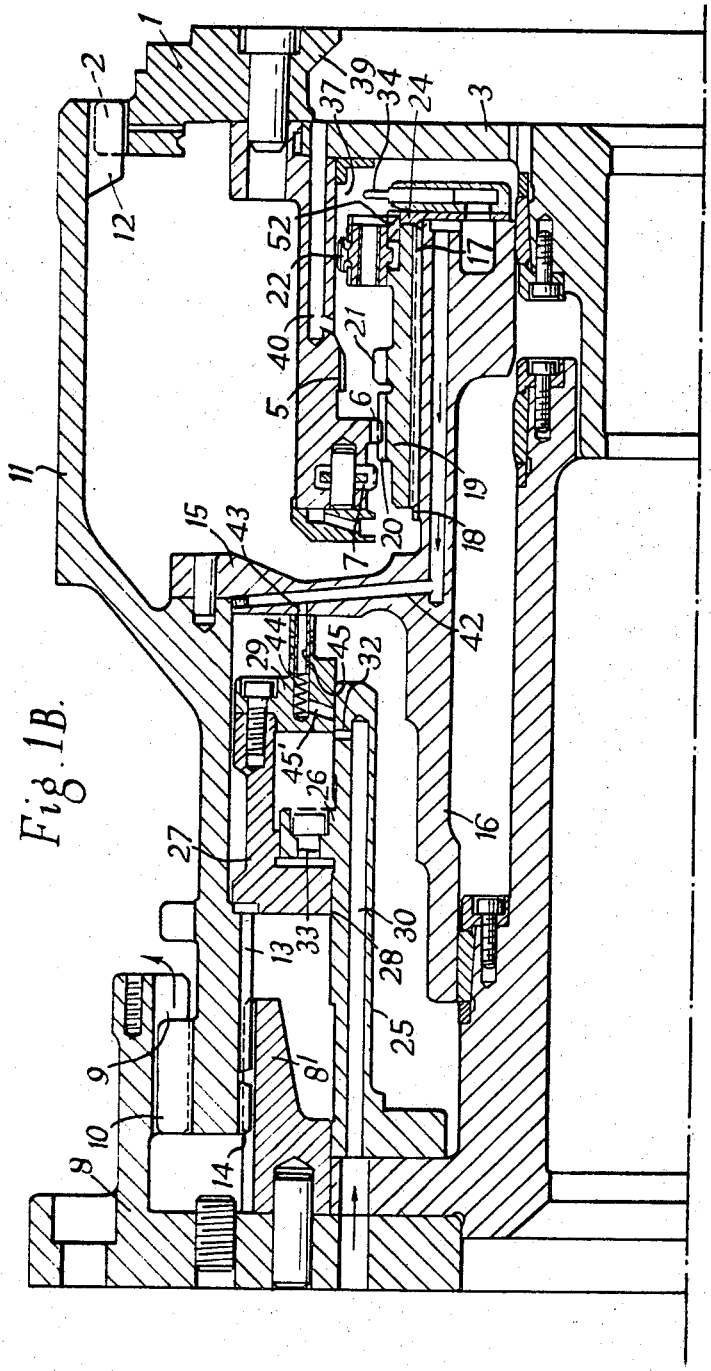

3,402,794
SYNCHRONOUS SELF-SHIFTING CLUTCHES
Harold Sinclair, Kensington, London, and Herbert Arthur Clements, Weybridge, England, assignors to S.S.S. Patents Limited, London, England
Filed Mar. 4, 1966, Ser. No. 532,004
Claims priority, application Great Britain, Apr. 6, 1965, 14,654/65
3 Claims. (Cl. 192—67)

ABSTRACT OF THE DISCLOSURE

An over-running toothed clutch having a dashpot for damping clutch engagement. When the clutch input part is rotating at a sufficient speed liquid is fed to the dashpot cylinder under pressure due to centrifugal force, through a duct or ducts in the input part. When the clutch input part is stopped or is rotating at low speed this pressure will be inadequate to charge the dashpot.

To meet this problem, the invention provides that when the clutch output member is rotating at a sufficiently high speed a rotating ring of liquid is formed in it, and a scoop tube transfers liquid from the ring to the dashpot cylinder when the input member is rotating slowly or is stopped.

---

This invention relates to over-running clutches, and particularly but not exclusively to synchronous self-shifting toothed clutches of the type comprising an input clutch member and an output clutch member, and clutch actuating mechanism operative upon passage of the said clutch members through rotational synchronism, said mechanism including an intermediate clutch member movable helically relative to one of said clutch members to effect at least partial interengagement to the coacting clutch teeth.

Figure 2:
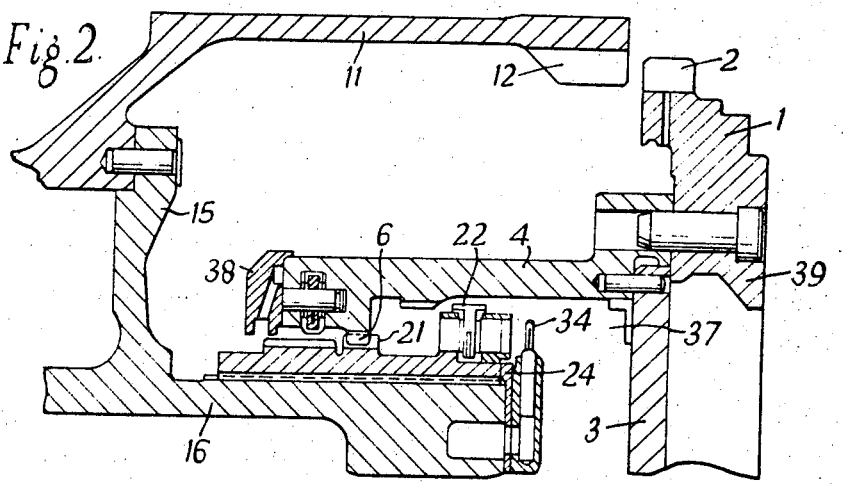
Figure 3:
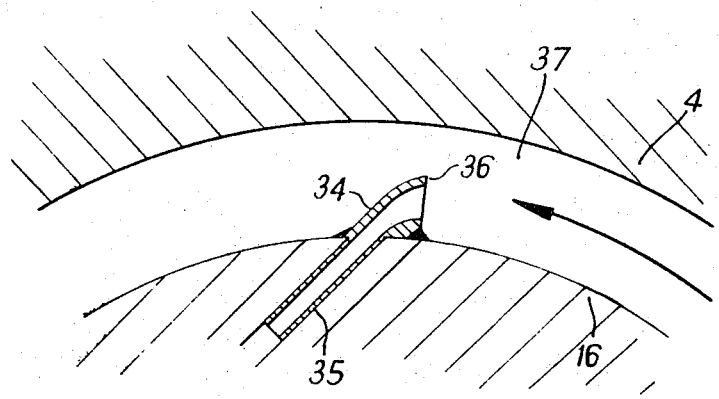

An embodiment of the invention will now be described with reference to the accompanying drawings, in which FIG. 1A is a view in axial half section of a synchronous self-shifting clutch according to the invention, the clutch being shown disengaged, and FIG. 1B is a similar view showing the clutch engaged, FIG. 2 is a detail view of part of the clutch, on a larger scale than FIG. 1, showing an intermediate condition of the clutch viz between the disengaged and engaged condition, and FIG. 3 is a detail view in cross-section, on a larger scale than FIG. 1, showing a scoop tube for transferring oil from the ring above-mentioned to the dashpot cylinder.

Referring to the drawings, the output member of the clutch is a ring 1 formed with external main clutch teeth 2 and bolted to a flange 3 and to a substantially cylindrical part 4 carrying a ring of internal ratchet teeth 5 and a ring of internal relay clutch teeth 6, and carrying diametrically opposite pairs of primary pawls 7 the noses of which are directed radially inwardly. The input clutch member comprises a ring 8 formed with widely spaced internal driving teeth 9 adapted to cooperate with widely spaced external driving teeth 10 on an intermediate member 11. The intermediate member 11 has a ring of internal main clutch teeth 12 adapted to engage with the external main clutch teeth 2 on the ring 1, and the intermediate member 11 is formed with internal right-hand helical splines 13 engaged with external helical splines 14 on a ring 8' bolted to the ring 8. To the intermediate member 11 is bolted an annular radially inwardly projecting flange 15 formed at its inner periphery with a sleeve 16 which projects axially in both directions from the flange 15. The part of the sleeve 16 that projects towards the ring 1 is formed with external right-hand helical splines 17 engaged in internal splines 18 in a relay intermediate member 19 which is formed with a ring of external straight splines 20 and with a ring of external relay clutch teeth 21, and which carries pairs of diametrically opposite secondary pawls 22 the noses of which are directed radially outwardly. Axial stops 23 and 24 on the sleeve 16 limit the helical movement of the relay intermediate member 19 relative to the said sleeve 16.

An axially projecting sleeve 25 carried by the ring 8 is formed with a radially outwardly projecting annular flange 26 which constitutes a dashpot piston. The cylinder of the dashpot is formed by an annular member 27 of U-section which surrounds the sleeve 25, with the flanges 28, 29 forming the limbs of the U projecting radially with the said flanges located one on each side of the piston 26 and with the radially inner cylindrical surfaces of the flanges in sliding contact with the radially outer surface of the sleeve 25. Over the major part of its length the inner cylindrical surface of the dashpot cylinder 27 has a radius such that an annular space is provided between the said surface and the cylindrical outer surface of the piston 26, but adjacent one end the radius is reduced so that the inner surface of the dashpot cylinder is capable of sliding contact with the outer surface of the piston.

The sleeve 25 is provided with a plurality of axial feed ducts, from which radial feed ducts lead to the interior of the dashpot cylinder. One axial duct and its associated radial feed ducts are shown in FIG. 1. The axial duct 30 communicates at its left hand end with an oil supply, and with two feed ducts 31, 32. The feed duct 31 is located so that with the clutch in the disengaged condition (FIGURE 1A) this duct 31 communicates with the dashpot chamber that is formed between the piston 26 and the flange 28 of the dashpot cylinder, which with the clutch disengaged is at the limit of its travel to the left (in FIG. 1) away from the piston 26. The feed duct 32 is located so that with the clutch disengaged and the flange 29 of the dashpot cylinder at the limit of its travel to the left towards the piston the feed duct 32 is closed by the radially inner surface of the flange 29 and hence does not communicate with the dashpot chamber that is formed between the piston 26 and the flange 29.

The operation of the clutch as so far described is similar to that of the clutch illustrated in FIG. 5 of British patent specification No. 974,937. Upon relative rotation of the ring 1 relative to the ring 8 in the clockwise direction as viewed from the left hand end of FIG. 1, the clutch overruns. When the direction of relative rotation commences to reverse, the engagement of primary pawls 7 or secondary pawls 22 with their associated ratchet teeth 21 or 5 causes the relay intermediate member 19 to shift helically to the right relative to the intermediate member 11 into contact with the axial stop 24 (FIG. 2), whereupon the intermediate member 11 is shifted helically to the right relative to the ring 8 to initiate interengagement of its main clutch teeth 12 with main clutch teeth 2 on ring 1, and the interaction of the main clutch teeth 12 and 2 completes their interengagement, the intermediate member 11 moving helically to the right relative to the ring 8 until the flanks of the widely spaced driving teeth 10 come into engagement with the flanks of the widely spaced driving teeth 9 on the ring 8″. The clutch is now in the engaged condition, as shown in FIG. 1B.

During the movement of the intermediate member 11 to the right the dashpot cylinder 27 moves with it to the right relative to the piston 26, which is fixed in relation to the ring 8. The initial part of the movement of the dashpot cylinder 27 takes place without much restraint since the piston 26 is surrounded by the part of the cylinder 27 of relatively large radius, and oil in the left-hand dashpot chamber can transfer to the other side of the piston 27 via the annular space around the piston 20 as well as through valve controlled restricted leakage ducts, one of which is shown at 33. When the dashpot cylinder 27 has moved through about half its travel to the right, the part of lesser internal radius moves on to the outer surface of the piston 26, so that during the further movement of the cylinder 27 to the right the oil in the left-hand dashpot chamber can no longer pass around the piston to the other side thereof. Dut to the restriction on the passage of oil through the relatively narrow leakage ducts 33 through the piston there would be a tendency for the oil to be expelled from the left hand dashpot chamber through the feed duct 31, but such expulsion is prevented by the radially inner surface of the flange 28 of the dashpot cylinder moving over the feed duct 31 and closing it as the part of the cylinder 27 of lesser internal radius moves on to the outer surface of the piston 26. As the intermediate member 11 continues to move to the right the feed duct 31 continues to be closed by the flange 28.

The width of the flange 29 of the dashpot cylinder 27 is such that during the final part of the movement of the intermediate member 11 in the clutch engaging direction, viz. to the right, the flange 29 uncovers the feed duct 32, so that it is now open and communicates with the dashpot chamber at the right-hand side of the piston 26. After the intermediate member 11 has reached the limit of its travel to the right the dashpot chamber at the right-hand side of the piston 26 is charged with oil transferred thereto from the left-hand side, any leakage losses being made good by oil supplied via the feed duct 32.

When the relative rotation of the input and output clutch members reverses and the clutch disengages, the intermediate member 11 moves to the left, and during the initial part of this movement there will be a tendency for oil at the right-hand side of the piston 26 to be expelled from the dashpot chamber on that side through the feed duct 32. However, after the intermediate member 11 has moved a short distance to the left the flange 29 of the dashpot cylinder moves over and closes the feed duct 32, and since the piston 26 is still surrounded by the part of the dashpot cylinder 27 of lesser internal radius, subsequent movement of the intermediate member 11 to the left is subject to a powerful damping action since the oil on the right-hand side of the piston 26 can transfer to the left-hand side thereof only through the restricted leakage ducts 33. This damping action continues until the part of the cylinder 27 of lesser internal radius has moved away from the piston 26, whereupon the oil can transfer from the right-hand side of the piston to the left-hand side thereof via the annular passage around the piston as well as through the leakage ducts 33.

During such times as the ring 8 is rotating at high speed, centrifugal force will provide a sufficient head of pressure for oil to be fed to the dashpot cylinder 27 via the feed duct 31 or 32 according to whether the clutch is engaged or disengaged. The pressure will however be inadequate or zero when the ring 8 is rotating at low speed or is stationary, and hence if the ring 1 is rotating and the ring 8 is accelerated to synchronism with the ring 1 the dashpot may not be sufficiently charged to damp the engagement of the clutch. To overcome this problem, a scoop tube 34 is provided for charging the dashpot with oil under these conditions of relative rotation. The scoop tube 34, which is fixed to the right-hand end of the part of the sleeve 16 that projects towards the ring 1, comprises a tubular shank 35 (FIG. 3) and a scoop orifice 36 located within an annular oil retaining chamber 37 formed by the flange 3, the inner surface of the cylindrical part 4, and an end ring 38 on the left hand end of the part 4.

An oil collector ring 39 is formed at the right-hand side of the flange 3, and ducts 40 (FIG. 1) are provided whereby oil fed to the ring 39 flows under centrifugal head to the oil retaining chamber 37, where due to the rotation of the ring 1 the oil forms into a rotating ring. The scoop orifice 36 of the scoop tube 34 faces the oncoming ring of oil (FIG. 3) so that with the ring 8 and hence the scoop tube 34 stationary, or rotating at a low speed, relative to the ring 1, oil is picked up by the scoop tube 34 and is transferred via the tubular shank 35 and ducts 41, 41′, 42 and 43 to axial ducts 44 formed in the flange 29 of the dashpot cylinder 27. Spring loaded hollow plungers 45 are located in the ducts 44, with their right-hand ends bearing on the flange 15, being in alignment with the oil ducts 43. Further ducts 45′ lead from the ducts 44 to the radially inner surface of the flange 29.

Adjacent the right-hand side of the piston 26 axial grooves 46 are formed in the radially outer surface of the sleeve 25, the grooves 46 being located so that with the clutch disengaged the radially inner ends of the ducts 45′ are each opposite one of the grooves 46 so that oil fed to the ducts 44 by the scoop tube 34 enters the grooves 46 and passes around the piston, thereby charging the left hand dashpot chamber.

As the ring 8 is accelerated, the scoop tube 34 is likewise caused to rotate at a continuously increasing speed, so that its speed relative to that of the ring 1 progressively decreases and the scooping effect is reduced, during which time the centrifugal head on the oil in the axial feed ducts 30 progressively increases. Hence the dashpot cylinder is adequately fed with oil under all operating conditions of the clutch which require damping of engagement.

We claim:

1. An over-running toothed clutch comprising a clutch input part, a clutch output part, and a hydraulic dashpot for damping clutch engagement, said dashpot including a dashpot cylinder and a dashpot piston, said clutch input part being formed with at least one passage for the supply of liquid to said dashpot cylinder under the action of centrifugal force when said clutch input part is rotating at a sufficient speed, characterized in that said clutch output part is formed to permit the establishment therein of a rotating ring of liquid when said clutch output part is rotating at a sufficient speed, and liquid transfer means are provided which serve to transfer liquid from said ring to said dashpot cylinder when with said clutch output part rotating as aforesaid said clutch input part is stopped or is rotating slowly.

2. An over-running clutch according to claim 1 wherein said transfer means comprise a scoop tube.

3. A synchronous self-shifting clutch having coacting clutch teeth and comprising an input clutch member, an output clutch member, and clutch actuating mechanism operative upon passage of said clutch input and output parts through rotational synchronism, said mechanism including an intermediate member constrained for helical movement relative to said clutch input part to effect at least partial interengagement of said coacting clutch teeth, the clutch including a hydraulic dashpot, comprising a cylinder and a piston, for damping clutch engagement, said clutch input part being formed with at least one passage for the supply of liquid to said cylinder under the action of centrifugal force when said clutch input member is rotating at a sufficient speed, characterised in that said clutch output part is formed with an annular chamber wherein a rotating ring of liquid can form when said clutch output part is rotating at a sufficient speed, and a scoop tube is provided for transferring liquid from said ring to said dashpot cylinder when said clutch output part is rotating as aforesaid and said clutch input part is stopped or is rotating slowly, said scoop tube being mounted for rotation with said intermediate member and having a scoop orifice located in said annular chamber.

References Cited
UNITED STATES PATENTS

| | | | |
|---|---|---|---|
| 1,238,098 | 8/1917 | Brinton | 192—58 |
| 2,660,279 | 11/1953 | Knight | 192—58 |
| 2,907,431 | 10/1959 | Sinclair | 192—67 |
| 3,326,056 | 6/1967 | Clements et al. | 192—67 |

BENJAMIN W. WYCHE III, *Primary Examiner.*

L. J. PAYNE, *Assistant Examiner.*